April 11, 1939.  C VIGNOS ET AL  2,153,903

AUTOMOBILE THEFT ALARM AND IGNITION LOCK

Filed June 6, 1934

Inventors
C. Vignos
C. D. Vollmer
By Frease and Bishop
Attorney

Patented Apr. 11, 1939

2,153,903

UNITED STATES PATENT OFFICE 2,153,903

AUTOMOBILE THEFT ALARM AND IGNITION LOCK

Charles Vignos and Charles D. Vollmer, Canton, Ohio

Application June 6, 1934, Serial No. 729,265

4 Claims. (Cl. 200—55)

The invention relates to a lock for an automobile door combined with electrical means for breaking the ignition circuit when the door is locked and an alarm which is operated when any of the doors or either side of the hood, the trunk or other locked part of the automobile is opened.

The object of the invention is to provide a lock for an automobile door, the lock being operatively connected to a double pole switch which opens the ignition circuit and renders operative an alarm circuit having therein switches arranged to be closed when any door or either side of the hood, the trunk or other locked part of the automobile is opened, a relay in said circuit being automatically operated when the circuit is closed whereby the alarm will continue to sound even though the door or hood or other part is again closed.

Another object of the improvement is to provide a novel double pole switch operatively connected to the door lock.

A further object is to provide means for opening the ignition circuit when the door lock is operated so that even though an unauthorized person may gain access to the automobile during the time the invention is in operation, he will be unable to start the automobile either by closing the usual ignition switch or by wiring around the same.

Figure 1:
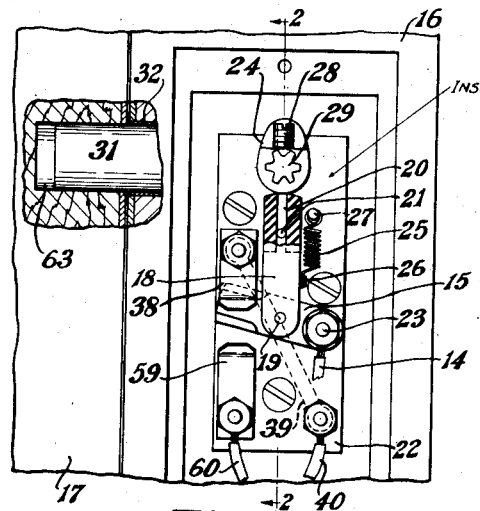
Figure 2:
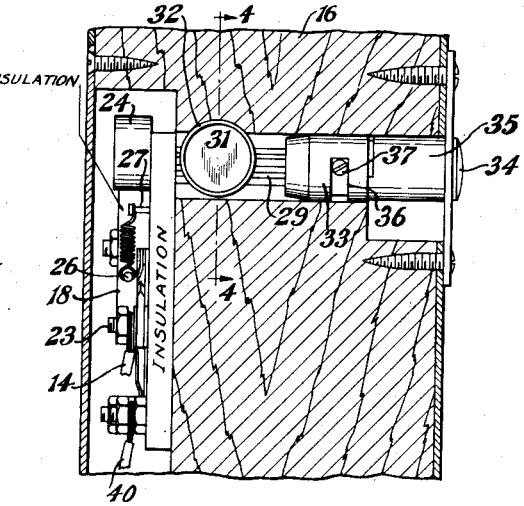
Figure 3:
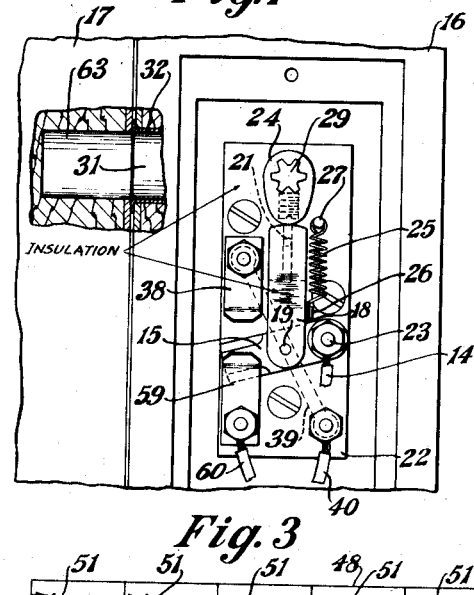
Figure 4:
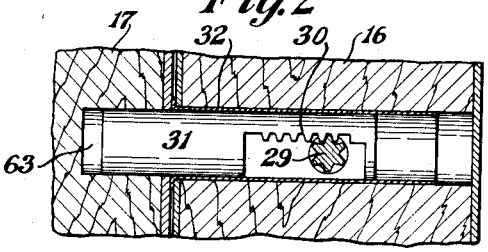
Figures 5, 6:
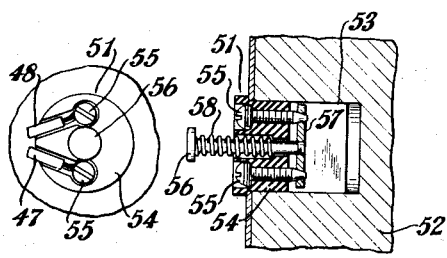

The above and other objects may be attained by constructing the improved automobile theft alarm and ignition lock in the manner illustrated in the accompanying drawing, in which Fig. 1 is a fragmentary elevation of a portion of an automobile door post and door showing the improved switch and lock in locked position, parts being broken away for the purpose of illustration;

Fig. 2, a transverse section through the switch and lock taken substantially on the line 2—2, Fig. 1;

Fig. 3, a view similar to Fig. 1 showing the lock in the unlocked position;

Fig. 4, a section through the lock bolt taken as on the line 4—4, Fig. 2;

Fig. 5, a longitudinal sectional view through one of the switches such as is provided in the alarm circuit at each door and at each side of the hood;

Fig. 6, an end elevation of the same; and

Figure 7:
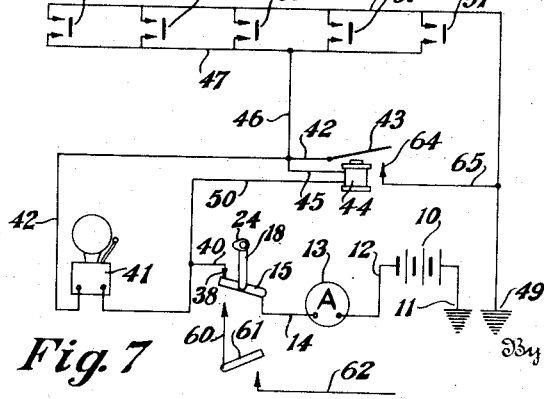

Fig. 7, a wiring diagram of the circuit.

Similar numerals refer to similar parts throughout the several figures of the drawing.

The usual battery of an automobile is indicated generally at 10, one side thereof being grounded as at 11 and a wire 12 leading from the other side to the ammeter 13 as in usual practice. A wire 14 leads from the ammeter to the pivoted end of the switch blade 15 of a double pole switch which may be mounted upon the door post 16 against which one door, fragmentarily shown at 17, is adapted to close.

An insulation bar 18 is pivoted at its lower end upon the switch blade 15 as shown at 19 and is provided in its rear surface with a groove 20 adapted to slide upon a stud or pin 21 fixed upon the insulation block 22 upon which the switch blade 15 is also pivotally mounted as by the binding post 23. The insulation bar 18 is normally urged upward against the cam 24 as by means of the pull spring 25 connected to a stud 26 upon said bar and to a stud 27 upon the insulation block 22.

The cam 24 is fixed as by the set screw 28 upon the lock spindle 29 which may be in the form of an elongated pinion as illustrated so as to mesh with the rack teeth 30 upon the lock bolt 31 which is slidably mounted in a bushing 32 located within the door post 16.

The spindle 29 may be fixed to a sleeve 33 which is located upon the cylinder 34 of a lock indicated generally at 35, said sleeve having a slot and pin connection to the lock cylinder as indicated at 36 and 37 respectively, so that with each full revolution of the cylinder the sleeve makes only a one-half revolution.

The switch blade 15 operates in a double pole switch, one contact 38 thereof being connected as by a bus bar 39 to the wire 40 in the alarm circuit, which leads to a bell, horn or other alarm, as indicated at 41, a wire 42 leading from said alarm to the armature 43 of a relay 44 and having a branch wire 45 leading therefrom to one end of the relay and a second branch 46 leading therefrom to a wire 47 parallel to the return wire 48 which is grounded as at 49. A wire 50 leads from the other end of the relay back to the wire 40.

Between the wires 47 and 48 are located in parallel a plurality of switches indicated generally at 51, one of these switches being located in each door and beneath each side of the hood of the automobile and so arranged that when any door or either side of the hood, the trunk or other locked part of the automobile is opened, the corresponding switch will automatically close.

Each of these switches 51 may be as shown in Figs. 5 and 6. In Fig. 5 a portion of a door post is indicated at 52 provided with a socket 53 in which the switch is located. The switch may include an insulation block 54 having two spaced contacts or binding screws 55 therein, one being connected to the wire 47 and the other to the wire 48.

A plunger 56 is slidably located through the insulation block 54 and provided at its end with a switch plate 57 arranged to be normally urged into contact with the contacts 55 as by a spring 58. When the door or hood is closed, it depresses the plunger 56 against the action of the spring 58, holding the switch plate 57 spaced from the contacts 55 so that the circuit is normally broken through said switch.

The other contact member 59 of the double pole switch shown in Figs 1, 2 and 3 is connected to a wire 60 which leads to the usual ignition switch indicated generally at 61, a portion of the usual ignition circuit being indicated at 62. Thus, it will be seen that when the double pole switch is operated to render the alarm circuit operative by the closing of one of the door or hood switches 51, the ignition circuit is broken so that the closing of the usual ignition switch 61, or wiring around the same by an unauthorized person will not close the ignition circuit.

In the operation of the invention, when it is desired to lock the car, the door 17 is closed and the proper key inserted into the cylinder 34 and turned, the pinion spindle 29 being rotated to the position shown in Figs. 1 and 4 and through the rack teeth 30, the lock bolt 31 is shot into the keeper socket 63 in the door, thus locking the door 17 in closed position.

The rotation of the spindle 29 from the unlocked position shown in Fig. 3 to the locked position shown in Fig. 1 rotates the cam 24 to the position shown in Fig. 1, permitting the spring 25 to raise the insulation link 18, moving the switch blade 15 out of contact with the contact member 59 and into contact with the member 38, placing the circuit in the position shown in Fig. 7. The ignition circuit is thus broken and the alarm circuit is placed in position to be closed by the closing of any one of the switches 51.

Assuming then that any door or either side of the hood, the trunk or other locked part is opened, the corresponding switch 51 will automatically close, closing the circuit through the alarm 41 which immediately starts to operate and through the relay 44 which pulls the armature 43 down against the contact member 64 which is connected by the wire 65 to the ground wire 48. If the door or hood is again closed, to open the closed switch 51, the circuit is thus closed through the armature 43 so that the alarm will continue to sound.

As the ignition circuit is broken through the double pole switch, it will be seen that even though the unauthorized person who has gained access to the car may be able to close the usual ignition switch 61 or to wire around the same from the wire 60 to the wire 62, he will be unable to start the car as the ignition circuit remains broken through the double pole switch.

We claim:

1. A lock for a hinged door and a door post against which the door is adapted to close, said lock being located within the door post and having a reciprocating bolt adapted to be received in a keeper socket in the door, a switch on the door post located in an electric circuit, and means operatively connecting the switch and the lock whereby the switch is moved to closed position by the locking of the bolt.

2. A lock for a hinged door and a door post against which the door is adapted to close, said lock being located within the door post and having a reciprocating bolt adapted to be received in a keeper socket in the door, a double pole switch on the door post located in two electric circuits, and means operatively connecting the switch and the lock whereby the switch is moved to position to close one circuit and break the other circuit by the locking of the bolt.

3. A combined lock and switch for a hinged door and a door post against which the door is adapted to close, said lock and switch being located within the door post and including a reciprocating bolt adapted to be received in a keeper socket in the door, the switch being located in an electric circuit and including a blade operatively connected to the bolt whereby the switch blade is moved to closed position by the locking of the bolt.

4. A combined lock and switch for a hinged door and a door post against which the door is adapted to close, said lock and switch being located within the door post and including a reciprocating bolt, a rotatable lock spindle operatively connected to said bolt to reciprocate the bolt, a cam fixed upon the lock spindle, a movable part in the switch, and spring means urging said movable part of the switch into contact with said cam whereby the switch is operated by the operation of the lock.

CHARLES VIGNOS.
CHARLES D. VOLLMER.